Aug. 8, 1950          C. W. JOHNSON ET AL          2,518,146
                    LIVESTOCK OPERATING TABLE
Filed Oct. 1, 1946                          4 Sheets-Sheet 1

INVENTORS
CARL W. JOHNSON &
FINCH L. JOHNSON

BY *Victor J. Evans & Co.*

ATTORNEYS

Aug. 8, 1950 — C. W. JOHNSON ET AL — 2,518,146
LIVESTOCK OPERATING TABLE
Filed Oct. 1, 1946 — 4 Sheets-Sheet 2
FIGURE 2
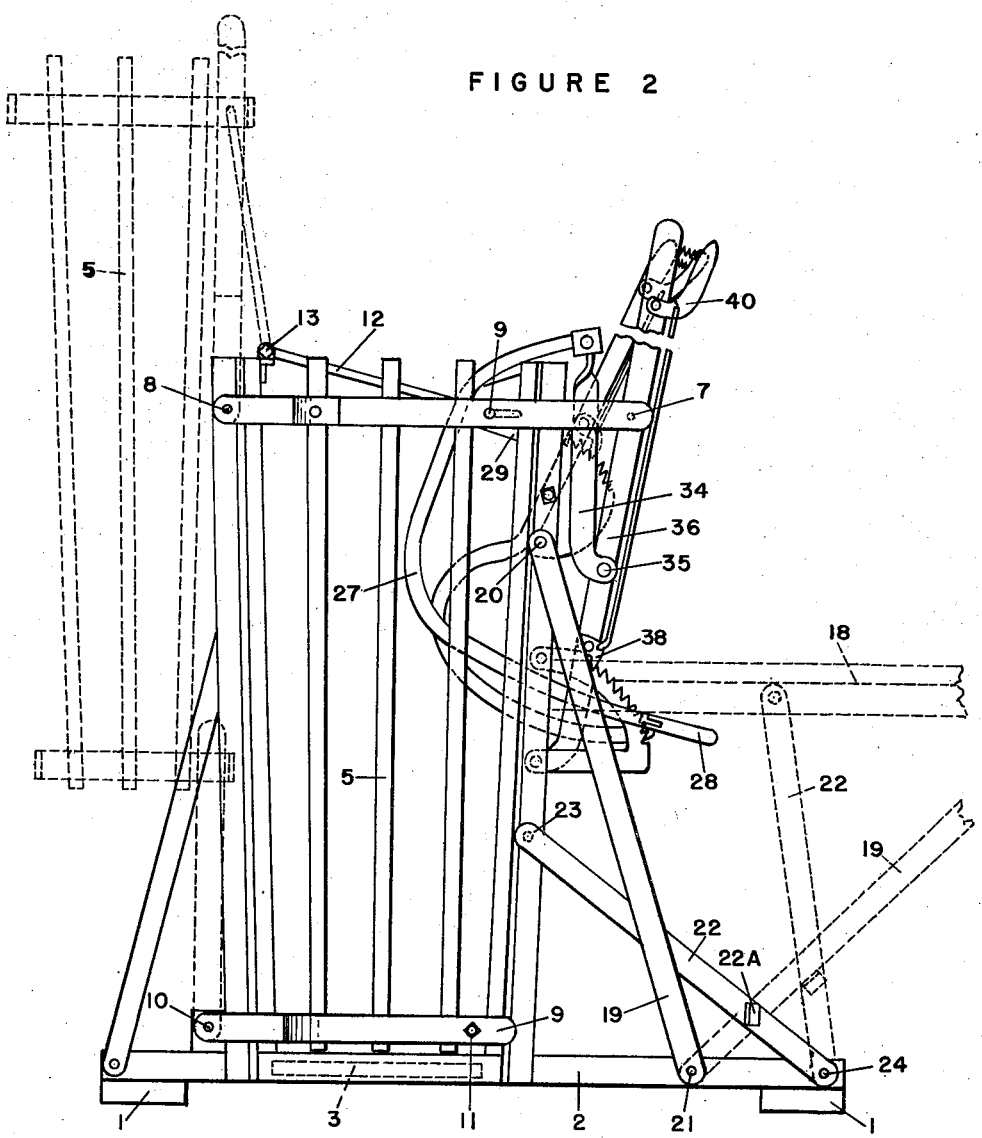
FIGURE 7
FIGURE 8
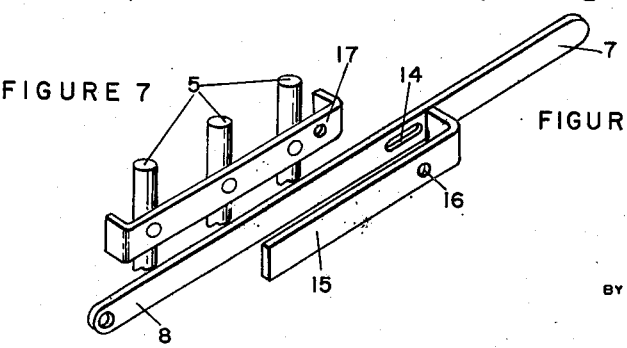
INVENTORS
CARL W. JOHNSON &
FINCH L. JOHNSON
BY *Victor J. Evans & Co.*
ATTORNEYS Aug. 8, 1950     C. W. JOHNSON ET AL     2,518,146
LIVESTOCK OPERATING TABLE Filed Oct. 1, 1946     4 Sheets-Sheet 3

INVENTORS
CARL W. JOHNSON &
FINCH L. JOHNSON

ATTORNEYS

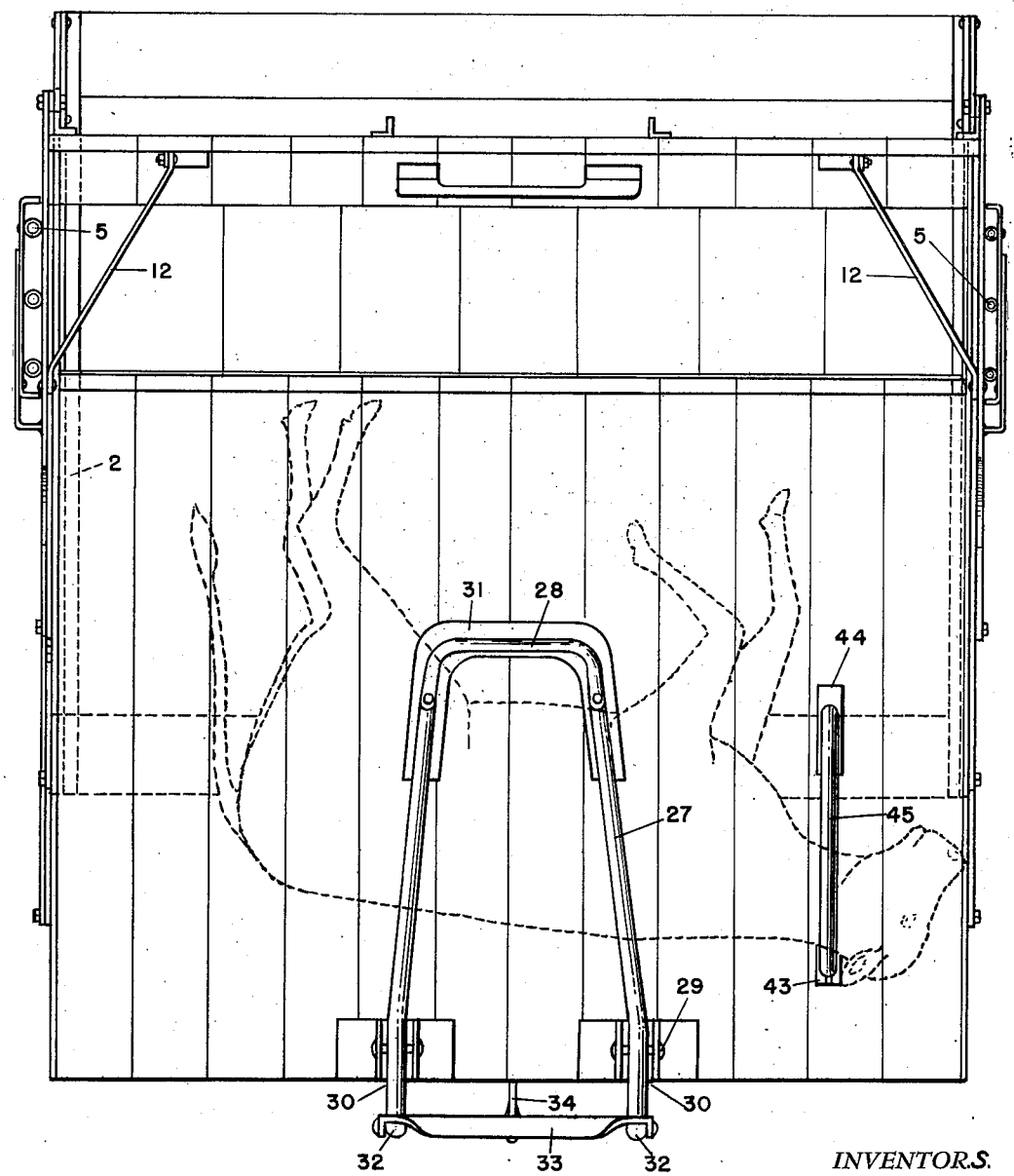

Patented Aug. 8, 1950

2,518,146

UNITED STATES PATENT OFFICE 2,518,146

LIVESTOCK OPERATING TABLE

Carl W. Johnson and Finch L. Johnson, Sheridan, Wyo.

Application October 1, 1946, Serial No. 700,436

9 Claims. (Cl. 119—103)

Our present invention relates to the animal industry including restraining appliances, and more specifically the invention pertains to a convertible pen and operating table for livestock for facilitating surgical and other operations such as dehorning, castrating, vaccinating, ear marking, branding and hoof-trimming, to be performed on the livestock.

The primary object of the invention is the provision of an appliance of this type that is simple in construction and operation by means of which the animal may with convenience be enclosed within the pen in a standing position; securely bound by restraining devices to a wall or panel of the pen; and then the panel may be opened outwardly from the pen or enclosure and converted into a horizontally disposed operating table. The appliance thus affords a convenient, safe, and sanitary method for the performance of a desired operation with accuracy and effectiveness.

The invention consists in certain novel combinations and arrangements of parts as will hereinafter be described and more specifically set forth in the appended claims.

In the accompanying drawings we have illustrated one complete example of the physical embodiment of our invention in which the parts are combined and arranged in accord with one mode we have devised for the practical application of the principles of our invention. It will be understood that changes and alterations are contemplated and may be made in these exemplifying drawings, within the scope of our claims, without departing from the principles of the invention.

Figure 2 is an end elevation, as seen from the left hand in Fig. 1, with one of the two gates in dotted line position.

Figure 4 is a top plan view of the appliance with the hinged panel in the horizontal position for use as an operating table with an animal held by the restraining devices outlined in dotted lines and with the mounting angles of the neck yoke omitted.

Figures 7 and 8 are detail perspective views of the latching means for one of the two gates of the pen.

Figure 1:
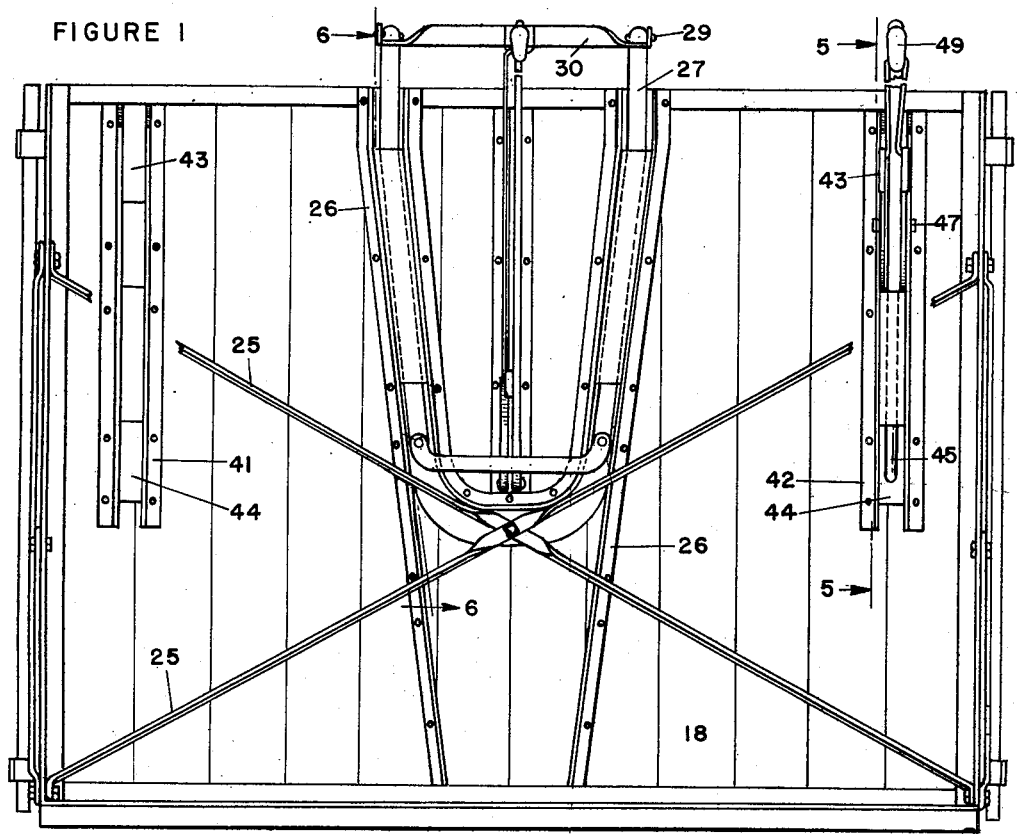
Figure 1 is a side elevation of a combined pen and operating table in which our invention is embodied, showing the operating mechanism for restraining or holding devices.

In carrying out our invention we preferably employ an enclosure or pen built upon spaced sills 1, 1, and cross beams 2, 2, of suitable material, which form a base for a floor 3; and a stationary upright wall 4 is erected upon the base to form a back wall for the pen, suitable braces as B being provided for reinforcing the back wall.

The opposite ends of the pen are closed by means of gates 5 and 6 supported on the stationary wall 4 and adapted to be opened by a combined lifting and backwardly shifting movement. For this purpose each gate is provided with an upper hinged lever arm 7 that is pivoted at 8 on the back wall, and adapted to be swung upwardly, as a handle, for opening the gate; and a complementary lower hinge arm 9 is pivoted at 10 to the base and at 11 to the gate.

As best seen in Figs. 7 and 8 the gates are each locked or latched in closed position by means of a latch bar 12 pivoted at 13 on the back wall 4, and the latch bar is provided with a pin and slot connection 14 to the lever arm 7. A guard plate 15 on the lever arm is provided with a transverse hole 16, and the upper rail of the gate is also provided with a similar hole 17, alined for co-action with the latch bar 12 for retaining the gate in closed position.

The end gates are selectively opened for catching the animal in the pen, and of course both gates are closed after the animal is in the pen. If the animal is to lie on its right side on the operating table, one gate is opened and the other gate closed, while the animal is driven into the pen; and in case the animal is to lie on its left side on the horizontal operating table, the position of the gates is reversed and the animal enters the pen from the opposite end. After the conclusion of the operation and the animal has been restored to standing position within the pen, the gate in front of the animal's head is opened to liberate the animal.

The front or operating side of the pen or enclosure is normally closed by a tiltable panel 18 that initially stands in upright position as a wall of the pen, and to which the confined animal, in standing position, is bound; and then the upright panel is converted into a horizontally disposed operating table upon which the animal is supported as best seen in Fig. 4.

For shifting the panel from vertical to horizontal position, and vice versa, the panel is equipped with an exterior flexible toggle frame consisting of a set of links, located in pairs, at the opposite end of the panel. Each pair of links includes a long link 19 pivoted at 20 to the panel with its lower end pivoted at 21 to a beam 2 of the base of the pen. The second and shorter link 22 of a pair is pivoted at 23 to the panel, with its lower end pivoted at 24 to a cross beam 2 of the base. The two pairs of links are reinforced and braced by crossed diagonal rods 25, 25, that extend longitudinally of the pen, to assist in supporting the panel when it is employed in horizontal position as an operating table, and the links 22 at opposite ends of the pen are equipped with stop lugs 22a for co-action with links 19 in providing a stable support for the table.

The convertible panel may manually be operated while bearing its load and swung outwardly from standing or vertical position, to horizontal position for use as a table, and after the operation the panel is restored to upright position with the animal standing upon the floor of the pen.

After entering the pen the animal is bound, by holding or restraining devices, to the upright panel, and for this purpose a neck stock and a body yoke, with separate operating means, are mounted upon the convertible panel, and manually operated to hold, and to release, the animal.

The body yoke is located at the approximate longitudinal center of the pen, and a supporting frame 26 for the yoke mechanism is mounted on the exterior side of the upright panel 18 which is slotted to accommodate the yoke in its movements transversely of the panel. The yoke which is indicated as a whole by the number 27 is provided with an end connecting bar 28 that unites the two hook-shaped arms to form a somewhat U-shaped yoke of ample dimensions to surround the body of an animal and secure the animal in standing position against the inner face of the upright panel.

The yoke is pivotally mounted at 29 in brackets attached at the inner side of the upright panel, and the free longitudinal edge of the panel is provided with spaced notches 30, 30, and a lower central slot 31, to accommodate the transverse swinging movements of the yoke in catching and in releasing the animal.

The ends of the hook-shaped bars forming the yoke are pivotally connected at 32 on the opposite ends of a horizontally disposed cross bar 33, and this bar, together with a perpendicular bar 34 forms a T-shaped link that is pivotally connected at 35 with a manually controlled operating lever 36 pivoted at 37 on a flange of the frame 26.

The operating lever is located at the longitudinal center of the panel, exterior of the pen, and it is equipped with a conventional latching mechanism or ratchet including a pawl 38, and rack 39 mounted on the frame 26, and the manual control device 40 mounted at the handle end of the lever.

Figure 6:
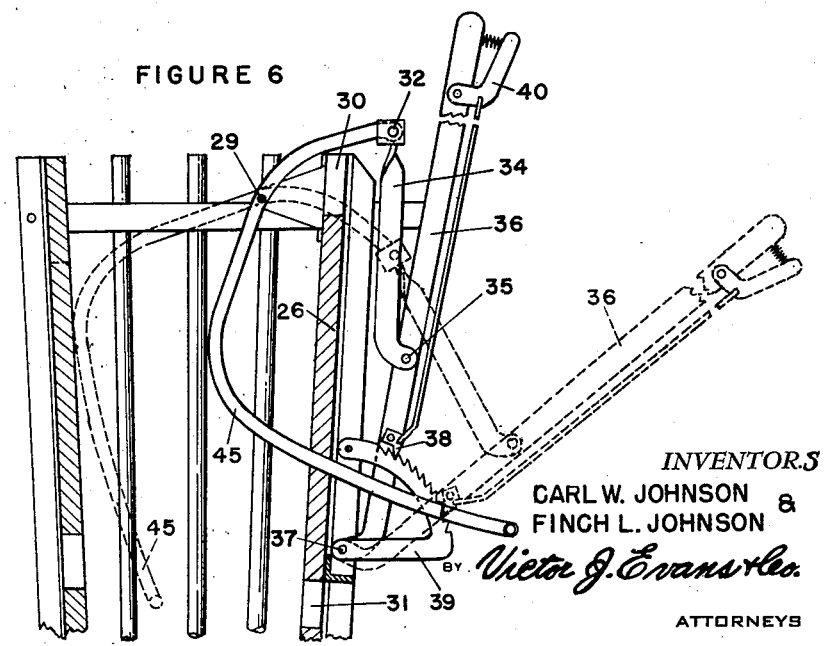
Figure 6 is a vertical transverse sectional view as at line 6—6 of Fig. 1 disclosing the body restraining device and its operating means.

In Figs. 2 and 6 the body yoke is shown in position before the animal enters the pen; in dotted position Fig. 6 the yoke is projected or extended to admit the animal to the pen, and then by an upward swing of the dotted lever the body yoke is made to embrace the animal in standing position, and the lever is then latched to retain the animal against the upright panel.

Figure 5:
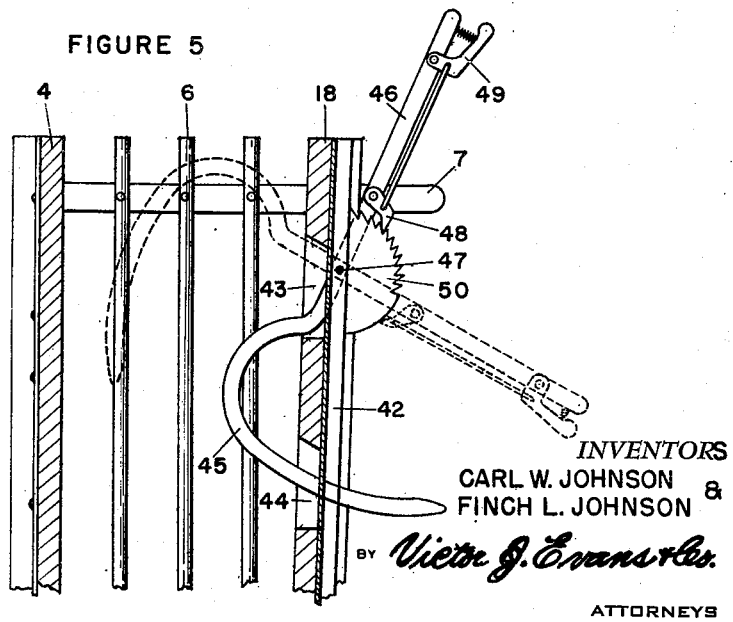
Figure 5 is a transverse vertical sectional view at line 5—5 of Fig. 1 showing the restraining device for the animal's neck and the operating means for the device.
Figure 3:
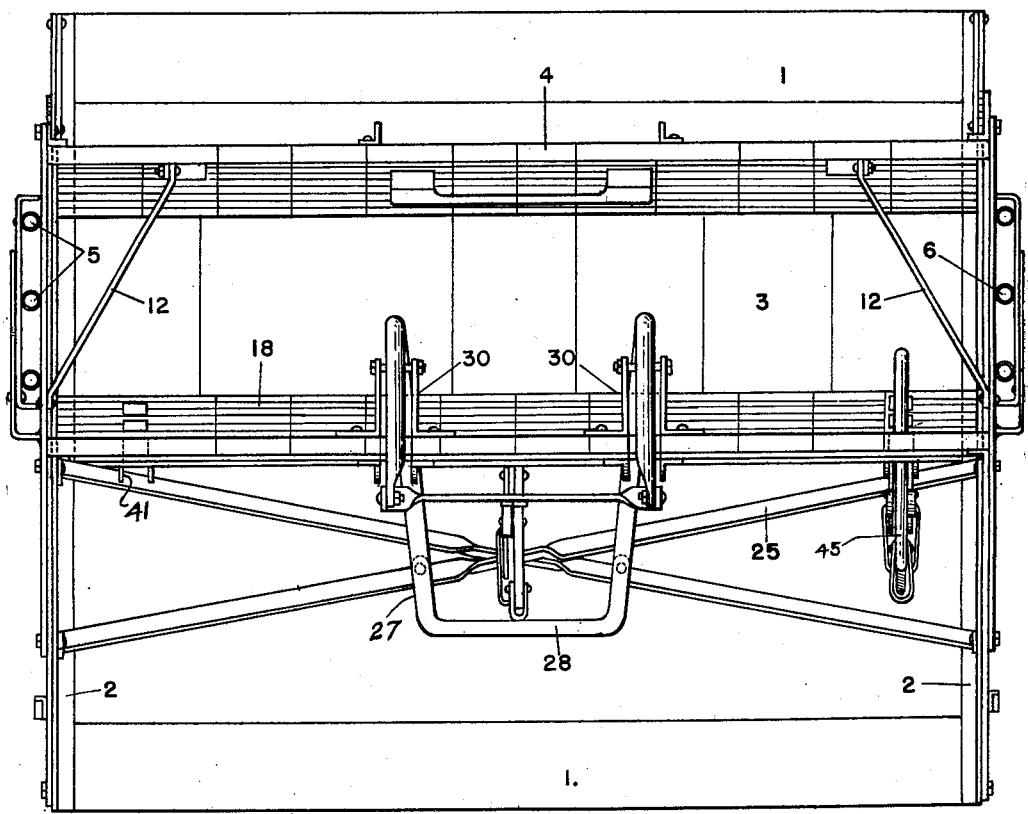
Figure 3 is a top plan view of the pen with parts in position for receiving an animal, but with both gates closed.

In Fig. 5 a restraining device is illustrated in the form of a sickle shaped neck stock that may be mounted at either end of the panel 18 in supporting frames 41 and 42 attached to the exterior face of the upright panel, which is provided with pairs of slots 43 and 44 to accommodate the transverse movements of the neck stock, through the panel. Like the end gates the neck stock is adapted for selective use for right hand operations and left hand operations on the animal, depending upon the entrance of the animal to the pen.

The head stock or neck stock 45, as shown in Fig. 5 is preferably of sickle shape, and it is an integral part of a hand operating lever 46 which is pivoted at 47 in a supporting frame 42 exterior of the upright panel, and a usual latching device or ratchet for the lever is provided by a pawl 48 and its manual control 49 on the lever, and a rack 50 mounted on the frame 42.

In dotted lines in Fig. 5 the neck stock is shown in position to admit the animal to the pen, and by an upswing of the dotted lever the stock is turned to embrace the neck of the animal, and fastened to restrain and hold the standing animal.

After the body yoke and the neck stock have been secured in place, the panel with its load is swung to horizontal position for the operation, and the animal is held as in Fig. 4 during the operation. After the operation, the panel is righted, the animal released, and the front gate is opened to liberate the animal.

Having thus fully described our invention, what we claim as new and desire to secure by Letters Patent is:

1. In an appliance as described, the combination with a pen or the like having a panel forming an upright wall and convertible to form an operating table, a body yoke pivotally mounted on the panel for restraining an animal on the table, and a sickle like neck stock pivotally mounted on the panel and actuated through the panel for holding the head of the animal of an exterior toggle frame having a pivotal base and pivoted to the panel, and co-acting stop-means on the toggle frame members for holding the panel in horizontal position for use as a table.

2. In an appliance as described, the combination with a pen having an end closure and means for opening the closure, a panel forming an upright wall of the pen and convertible for use as an operating table, a body yoke pivotally mounted on the panel and a sickle-like neck yoke pivotally mounted on the panel, of an exterior flexible toggle frame having a pivotal base and pivotally connected with the panel to brace it in upright position, and means for rigidly holding the frame in supporting position beneath the panel when the latter is utilized as a table.

3. In an appliance as described, the combination with a pen having a stationary wall, two end gates and means for opening the gates, a panel forming a second upright wall and convertible for use as a horizontal operating table, a body yoke pivotally mounted on the panel, means actuating the body yoke through the panel, ratchet means securing the body yoke in operative position, and a sickle like neck yoke pivotally mounted on the panel, of a flexible folding frame having a pivotal base and pivotally connected to the exterior of the upright panel to brace it in upright position, and means for retaining the frame in supporting position beneath the panel when the latter is utilized as an operating table.

4. In an appliance as described having a panel forming an upright wall and tiltable to form a horizontal operating table, the combination of a body yoke pivotally mounted at one side of the panel and movable transversely through a slot of the panel, an operating lever pivoted at the other side of the panel and a T-shaped link connecting the lever with the yoke, means for securing the lever in adjusted position, and a sickle-like neck yoke pivotally mounted on the panel for holding the head of an animal thereon.

5. In an appliance as described having a panel forming an upright wall and tiltable to form a horizontal operating table, the combination of a neck-stock of sickle-shape transversely movable through slots of the panel, an operating lever rigid with the stock and pivotally mounted on the panel, and means for securing the lever in adjusted position.

6. In an animal operating table, the combination which comprises a stock having a stationary wall and a tiltable panel, said tiltable panel having slots therein, a sickle-like neck stock pivotally mounted on said panel, an operating lever integral with said neck stock for actuating said neck stock through a slot in the panel, a centrally disposed body yoke pivotally mounted on the panel, a lever also pivotally mounted on the panel and connected to the body yoke for actuating said body yoke through slots in the panel, and means mounting said tiltable panel whereby the panel is actuated to a horizontal position.

7. In an animal operating table, the combination which comprises a stock having a stationary wall and a tiltable panel, said tiltable panel having slots therein, a sickle-like neck stock pivotally mounted on said panel, an operating lever integral with said neck stock for actuating said neck stock through a slot in the panel, a centrally disposed body yoke pivotally mounted on the panel, a lever also pivotally mounted on the panel and connected to the body yoke for actuating said body yoke through slots in the panel, ratchets for locking said levers in operative positions, and means mounting said tiltable panel whereby the panel is actuated to a horizontal position.

8. In an animal operating table, the combination which comprises a stock having a stationary wall and a tiltable panel with removable gates at the ends, said tiltable panel having slots therethrough, a sickle-like neck stock pivotally mounted on the said panel, an operating lever integral with said neck stock for actuating the neck stock through a slot in the panel, a ratchet for holding the lever in operative position, a centrally disposed body yoke pivotally mounted on the panel, a hand lever also pivotally mounted on the panel and connected to said body yoke for actuating the body yoke through slots in the panel, a ratchet for holding the hand lever in operative position, means elevating the gates to open positions, and means whereby said tiltable panel may be actuated to an operating position.

9. In an animal operating table, the combination which comprises a stock having a stationary wall and a tiltable panel, means mounting the said tiltable panel for pivoting action to a substantially horizontal position, said tiltable panel having slots therethrough, a centrally disposed body yoke pivotally mounted on the tiltable panel, a lever also pivotally mounted on the panel, a link connecting the lever with the body yoke whereby the body yoke may be actuated through the panel to hold the body of an animal on the opposite side, a neck stock pivotally mounted on said panel and means actuating the neck stock through a slot in the panel to grip the head of an animal on the opposite side of the panel.

CARL W. JOHNSON.
FINCH L. JOHNSON.

REFERENCES CITED

The following references are of record in the file of this patent:

UNITED STATES PATENTS

| Number | Name | Date |
|---|---|---|
| 572,792 | Gates | Dec. 8, 1896 |
| 1,388,258 | Hasty | Aug. 23, 1921 |
| 1,842,015 | Finson | Jan. 19, 1932 |

FOREIGN PATENTS

| Number | Country | Date |
|---|---|---|
| 36,176 | Germany | July 15, 1886 |
| 20,704/29 | Australia | June 18, 1929 |